United States Patent [19]

Mumford et al.

[11] 4,199,344
[45] Apr. 22, 1980

[54] 90° SWEEPOUT CYLINDER WITH ADJUSTABLE STROKE

[75] Inventors: Eustace H. Mumford, Ottawa Lake, Mich.; Jack I. Perry, Toledo, Ohio

[73] Assignee: Owens-Illinois, Inc., Toledo, Ohio

[21] Appl. No.: 942,585

[22] Filed: Sep. 15, 1978

[51] Int. Cl.$^2$ .................... C03B 9/04; B65G 47/00
[52] U.S. Cl. .................... 65/260; 92/13; 92/13.7; 198/490
[58] Field of Search .............. 65/260; 198/490; 92/13, 92/13.7

[56] References Cited

U.S. PATENT DOCUMENTS

| | | | |
|---|---|---|---|
| 2,660,831 | 12/1953 | Rowe | 65/290 X |
| 3,559,537 | 2/1971 | Faure | 198/490 |
| 3,595,365 | 7/1971 | Faure | 198/490 |
| 3,735,854 | 5/1973 | Hirsch et al. | 198/490 |
| 3,812,690 | 5/1974 | Faure | 65/260 |
| 3,813,963 | 6/1974 | Wortley | 92/13.7 X |

*Primary Examiner*—S. Leon Bashore
*Assistant Examiner*—Frank W. Miga
*Attorney, Agent, or Firm*—D. T. Innis; Myron E. Click; David H. Wilson

[57] ABSTRACT

Apparatus for moving newly formed glass containers from a cooling dead plate to a moving machine conveyor in which the ware is engaged by a finger, with the finger being generally horizontal and engageable with the container at a point on its sidewall which best suits the moving of the container by a sliding motion. The finger, or fingers in the case of plural containers being simultaneously moved, is moved through an arc approximately 90° with respect to its vertical axis, moving the containers from the dead plate to the conveyor and then the finger is retracted out of contact with the containers on the conveyor. After retraction, the finger-mounting mechanism which takes the form of a generally horizontally disposed cylinder is moved back through 90° to a position opposite the position of a dead plate where the finger is then again moved outward and rotated about the axis of the cylinder mounting. In this fashion the containers are moved onto the conveyor. In this mechanism an improved mounting cylinder is described which provides adjustability with respect to the extent to which the finger members are moved, such adjustment being easily made by movement of a single threaded bolt. The motor or drive cylinder contains a relatively short stroke piston motor which, in turn, through a gear cluster, drives racks supporting the finger mounting system. The mechanical advantage of the gear cluster is such that a short stroke of the piston results in a fairly long stroke in the rack drive for the finger.

9 Claims, 7 Drawing Figures

90° SWEEPOUT CYLINDER WITH ADJUSTABLE STROKE

BACKGROUND OF THE INVENTION

In the operation of 90° sweepout mechanisms for glassware forming machines of the IS type, the ability to position ware on a moving conveyor depends upon the smoothness with which the transfer mechanism handles the bottles and also with respect to the speed with which the mechanism can provide sliding movement to the containers without tipping the containers. When forming machines which run at speeds of up to 10–15 cycles per minute and which may make as many as three containers at a time, it can be seen that movement of all of these containers onto a single moving conveyor must be a relatively precise operation. Production of an individual section is, for example, twelve bottles per minute single cavity. To run such a machine, triple cavity would be thirty-six bottles per minute. It is common practice also at the present time to run eight sections in conjunction with a single machine conveyor. Thus, in the order of 280 or more bottles per minute will be produced, all of which will have to be moved onto the machine conveyor in a closely and carefully time relationship.

An example of the prior art is to be found in U.S. Pat. No. 3,812,690 which discloses a 90° sweepout mechanism for handling two containers at a time. The invention in the above-referenced patent is directed to a system for adjusting the position of the retraction of the motor driven ware-engaging finger.

An additional patent, as an example of the prior art, is U.S. Pat. No. 3,249,200 which shows a ware transfer means for an IS machine in which an automatically operable apparatus is associated with a glassware forming machine section and is driven by a drive that is common for all of the sections. Typically, a common drive shaft will extend along the length of the machine sections, with the shaft carrying a barrel cam at each section location. Rotation of an individual barrel cam operates a crank arm that is connected to a cam follower, with the crank arm being biased by a spring through an elongated chain which is in mesh with a drive sprocket. Movement of the cam follower will pull the chain and, as a result, rotate the sprocket. The sprocket in turn will be connected through a drive system to a horizontally positioned motor for oscillating the motor about the axis of the sprocket. The motor controls the movement of ware-engaging means to an extended position to thereby engage ware on the dead plate and then move the ware from the dead plate to a conveyor. The function of this drive mechanism disclosed in the above-mentioned U.S. Pat. No. 3,249,200 patent is similar to the function of the mechanism which is set forth in the present case.

SUMMARY OF THE INVENTION

Ware transfer mechanism in which an improved horizontal cylinder is used to extend and retract fingers which engage ware on a dead plate. The ware is moved from the dead plate by rotation of the motor about a vertical axis through an approximate 90° angle, while the motor is extended and then provide for retraction of the motor and then return of the motor about the vertical axis to its original position. The motor includes a gear cluster arrangement for driving a pair of racks at a greater velocity than the motor speed to effect improved handling of containers and adjustment of the extent of movement of the fingers.

DETAILED DESCRIPTION OF THE DRAWINGS

Figure 1:
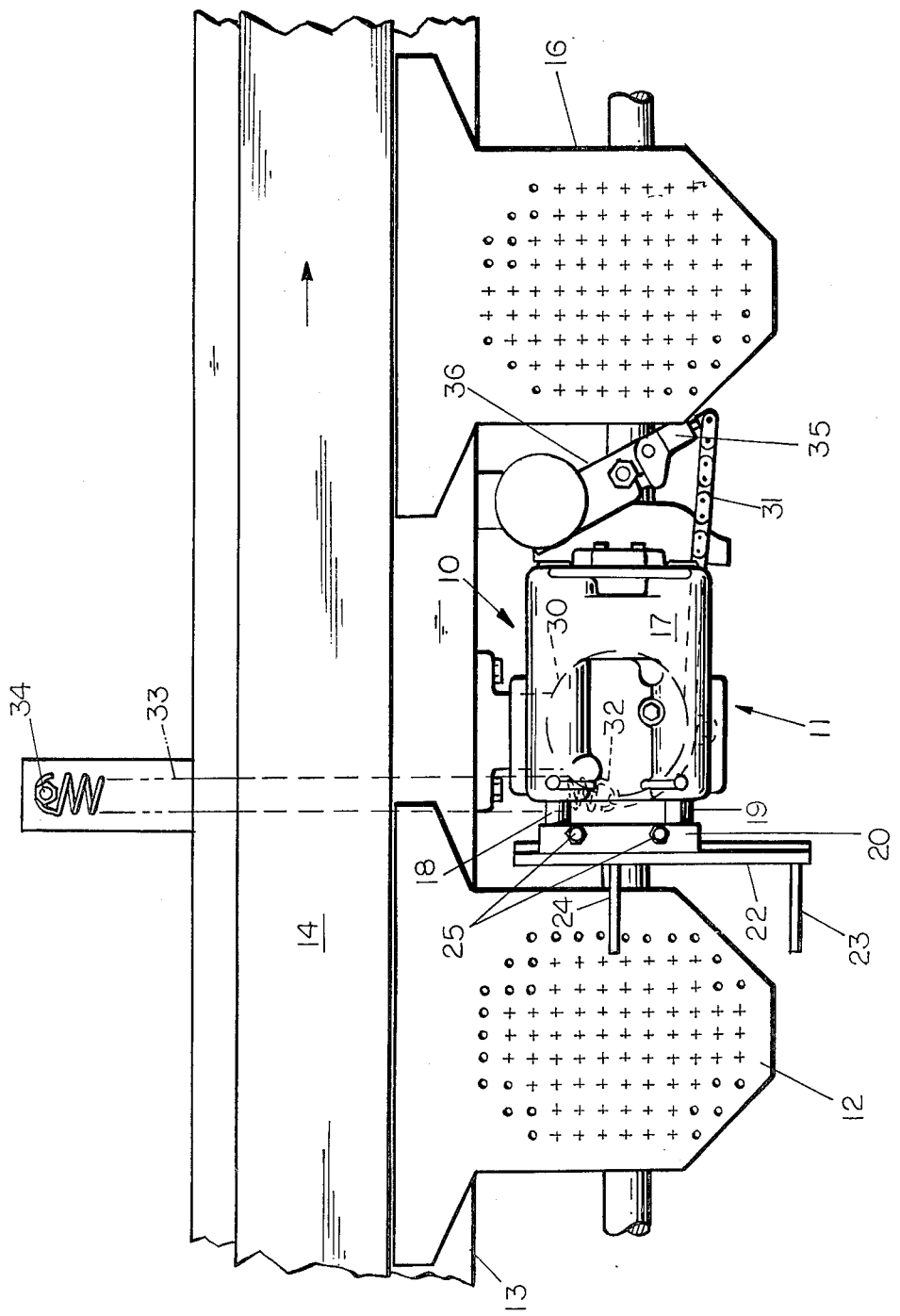
FIG. 1 is a top plan view of the apparatus of the invention in its environment of use.
Figure 2:
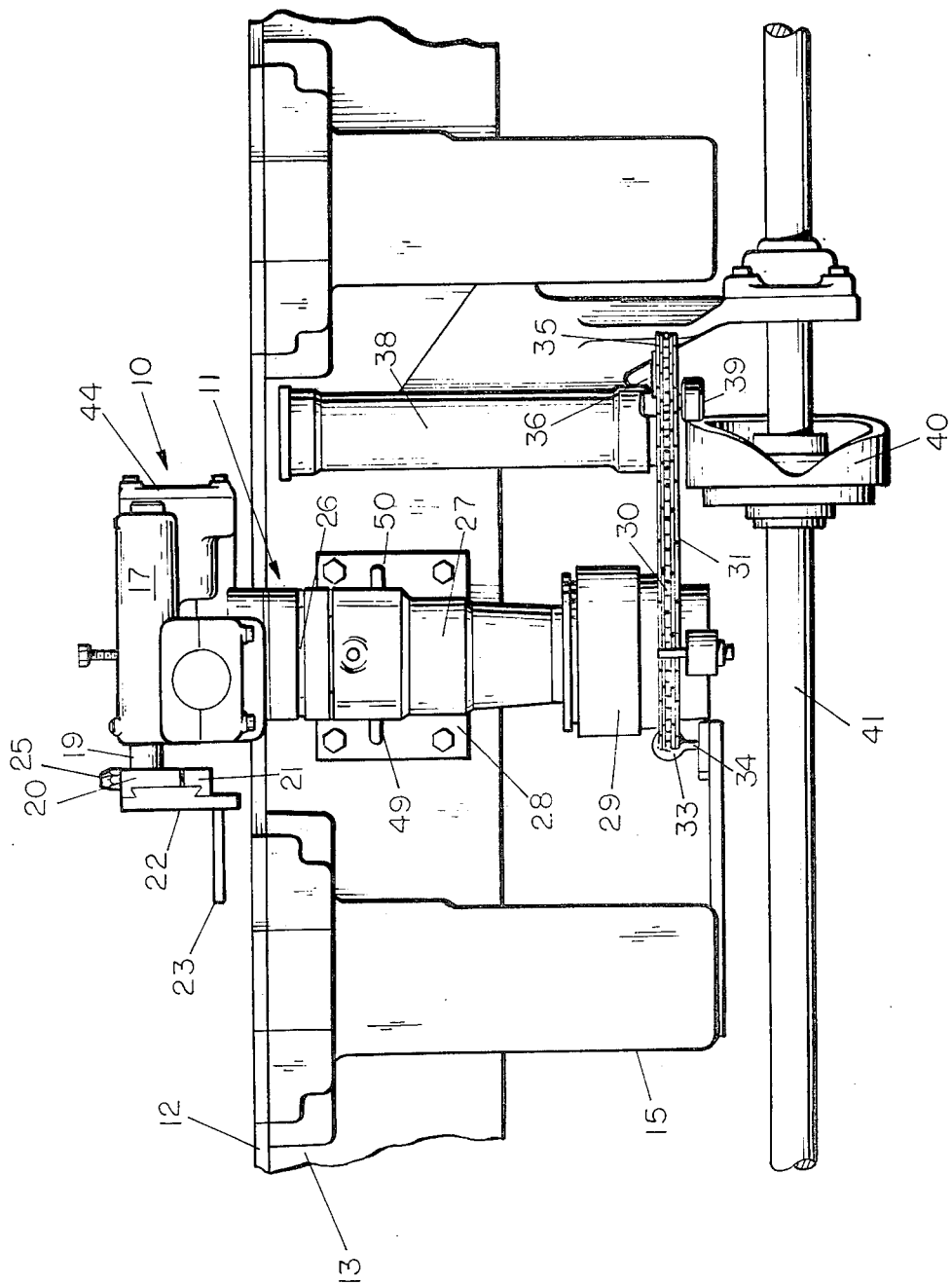
FIG. 2 is a side elevational view of the apparatus of FIG. 1.
Figure 3:
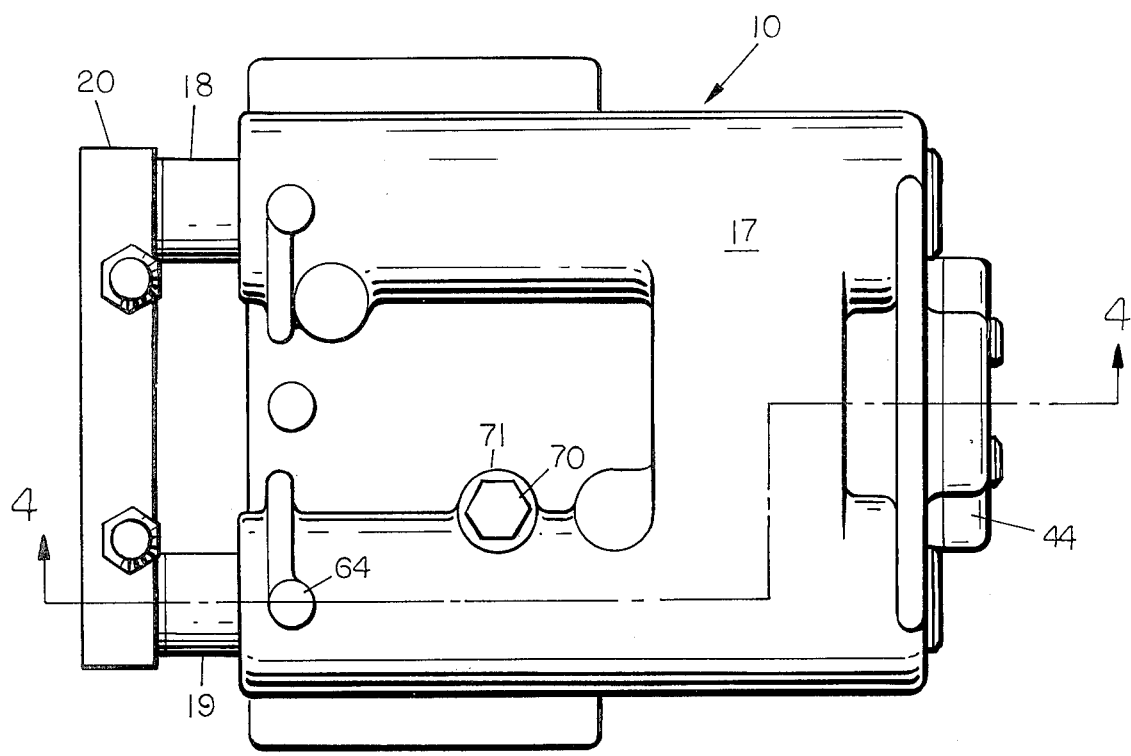
FIG. 3 is a top plan view of the improved fluid motor system of the invention.

With particular reference to FIGS. 1 and 2, the general arrangement of the apparatus of the invention will be described. The previously mentioned fluid motor is generally designated by the reference numeral 10. In the various figures of the drawings and the base to which the motor is mounted, is generally designated by numeral 11.

As shown in FIGS. 1 and 2, the motor 10 is positioned on the base 11 to generally face in the direction of a dead plate 12. It should be understood that the dead plate 12 is of a size to receive a pair of newly formed glass containers on its upper surface in approximately the location of the dotted circles shown thereon. Dead plate 12 is fixed to the side of a conveyor 13 which has an upper surface 14 moving in the direction of the arrow shown thereon in FIG. 1.

In conventional practice, the conveyor 13 has a generally rectangular shape in cross section, and is also utilized to carry cooling air that is fed into a plenum chamber 15 beneath the cooling dead plate 12. The cooling air then exits through the numerous perforations formed in the surface of the dead plate 12. A similar dead plate 16 is positioned adjacent to the dead plate 12, it being understood that the dead plate 16 will receive ware from another section of a forming machine and also will be handled by a sweepout mechanism of the same design as that to be described in detail below.

The fluid motor 10 and its base 11 are oscillated between the position shown in FIG. 1 to a position which would be 90° in a clockwise direction, as viewed in FIG. 1. In its turned position, the motor 11 would face in the direction of the moving conveyor surface 14. This 90° movement of the motor 10 will provide for sweeping containers from the dead plate 12 onto the surface 14 of the conveyor 13. Fluid motor 10 is preferably pneumatic and is of the reversible type. Housing 17 of the motor is stationary and upon actuation of the motor a pair of rods 18 and 19 will be moved in and out. The outer ends of the rods 18 and 19 carry a cross bar 20. The cross bar 20, in cooperation with a clamp bar 21, forms a dovetail slot facing in the direction of the dead plate 12. Within this dovetail slot is positioned an elongated bar 22 carrying a pair of spaced-apart fingers 23 and 24. The cross bar and the clamp bar are held together by a threaded bolt which extends from the clamp bar 21 through openings formed in the cross bar 20 and held together by acorn nuts 25. The horizontal position of the bar 22 relative to the conveyor may obviously be adjusted, and while the present bar is shown as carrying two fingers, it should be obvious that any combination of fingers could be likewise carried by the bar 22 and could be adjusted horizontally relative to the clamp bar 21.

The base 11 of the motor 10 is connected to a vertical shaft 26 that extends downwardly through a support housing 27. The housing 27 is carried by a plate 28 that is bolted to the side of the conveyor 13. The casting which forms the plate 28 also includes passages therein for providing fluid access to the fluid motor mounted thereabove, through the base 11. Generally speaking, the shaft 26 extends downward into a lower housing 29. The housing 29 is provided with a sprocket 30 which is engaged by an elongated chain 31. Chain 31 has one end 32 connected to a long spring 33, with the spring 33 being anchored at its opposite end at 34 to a stationary portion of the machine conveyor support. The other end of the chain 31 is connected to an extended end 35 of an arm 36. The arm 36 is mounted for pivotal movement about the vertical axis of a shaft 37. The shaft 37 is fixed in position within a housing 38. Intermediate its length, the arm 36 is provided with a cam follower roller 39. The cam follower roller 39 is in engagement with a barrel cam 40 carried by a horizontal shaft 41 which is driven by the main machine timing system. The foregoing is a general explanation of the operation of the sweepout mechanism.

Figure 5:
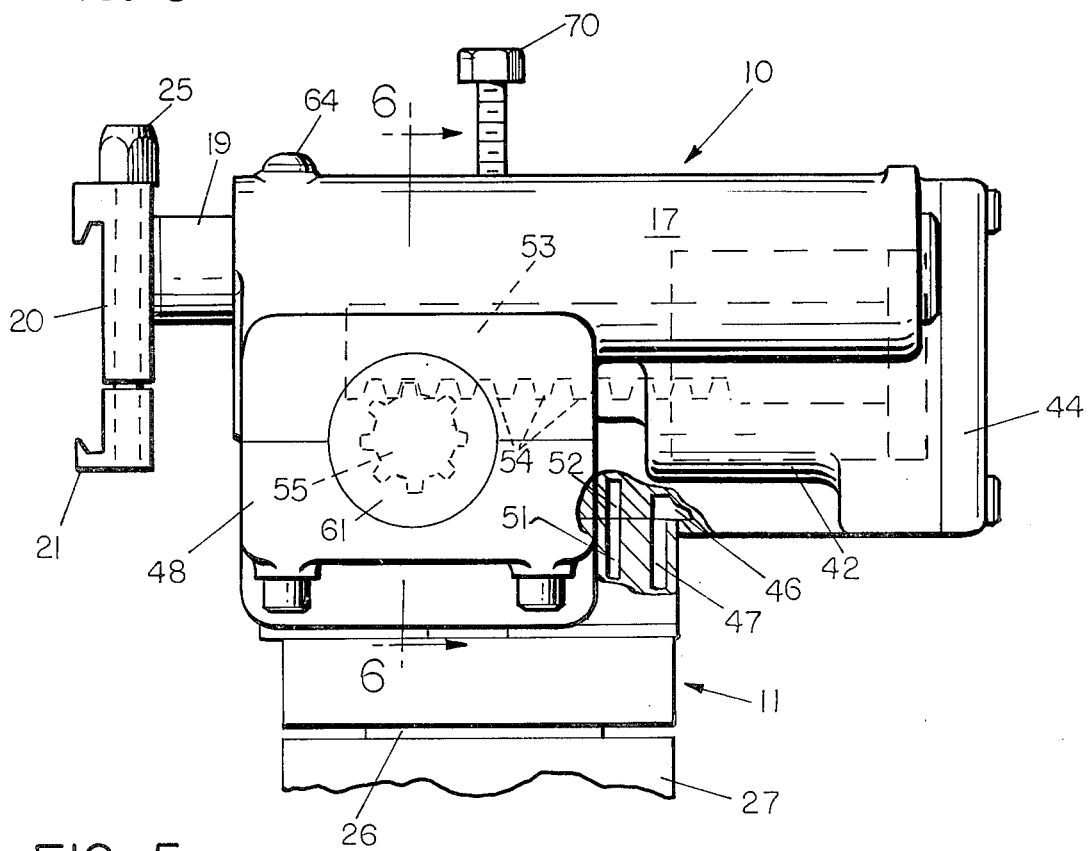
FIG. 5 is a side elevational view of the improved motor apparatus of FIG. 3.
Figure 4:
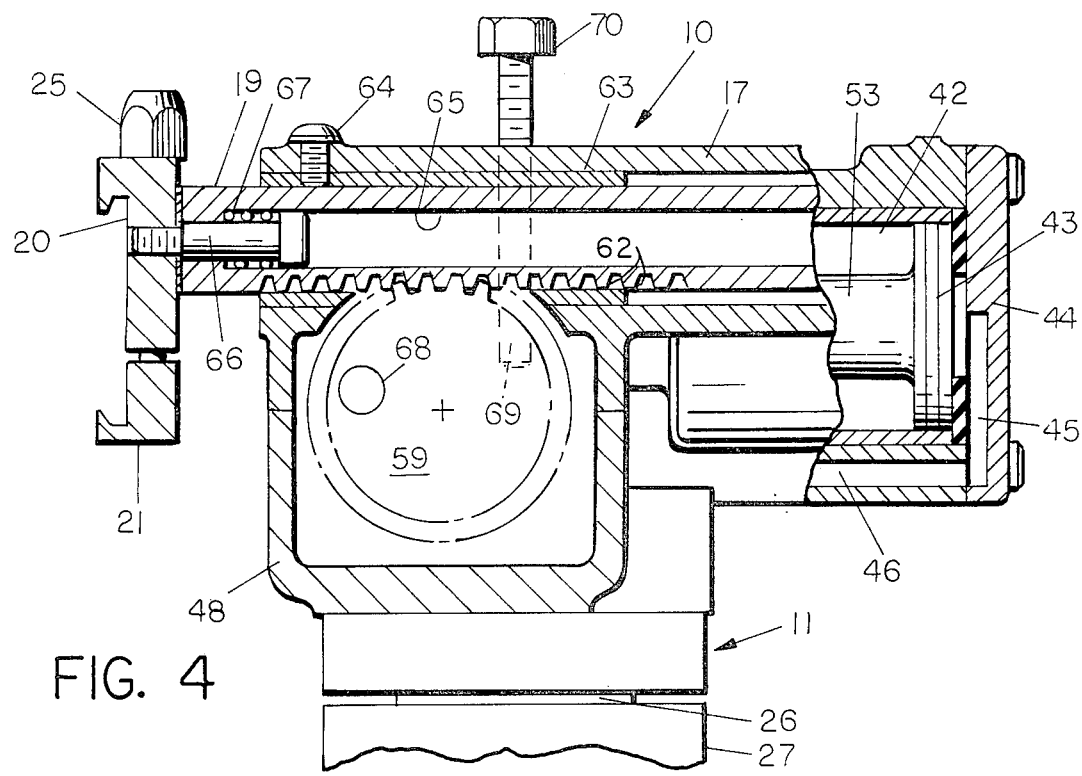
FIG. 4 is a cross sectional view taken at line 4—4 of FIG. 3.

Turning now to FIGS. 3-7, a detailed description of the motor 10 will be given. As previously stated and as can be seen in detail, motor 10 is comprised of a casting or housing 17 within which a cylinder 42 is formed. The cylinder 42 surrounds a piston 43. The piston 43 is reciprocably mounted in the cylinder 42. As best shown in FIG. 4, the cylinder 43 has its right-hand end closed by a plate 44 which is bolted thereto. Plate 44 has a generally vertical passageway 45 formed therein which communicates with a horizontal passage 46 formed in the lower wall of the housing 17. Passage 46, as best shown in FIG. 5, communicates with a vertical passage 47 in a lower housing section 48. The housing section 48 is supported on the base 11. Operating air which is to be supplied through the passage 47 will enter the base 11 from the support housing 27, it being understood that the support housing 27 has a pair of pipes 49 and 50 which are intended to be connected through the base 11 in the manner described in U.S. Pat. No. 3,249,200, cited above. A second passage 51 in the housing section 48 communicates with a passage 52 in the motor housing 17, it being understood that the passage 52 communicates with the forward end of the cylinder 42 to, in effect, become the connection for the retracting fluid. The piston 43 carries a horizontally extending rod 53 having a portion of its lower surface formed into a set of gear teeth 54 to thus form, in effect, a horizontal rack. The teeth 54 of the rod 53 mesh with a spur gear 55 formed as the center gear of a gear cluster generally designated 56. The gear cluster 56 consists of the spur gear 55, a horizontal shaft 57 and a pair of spur gears 58 and 59.

Figure 6:
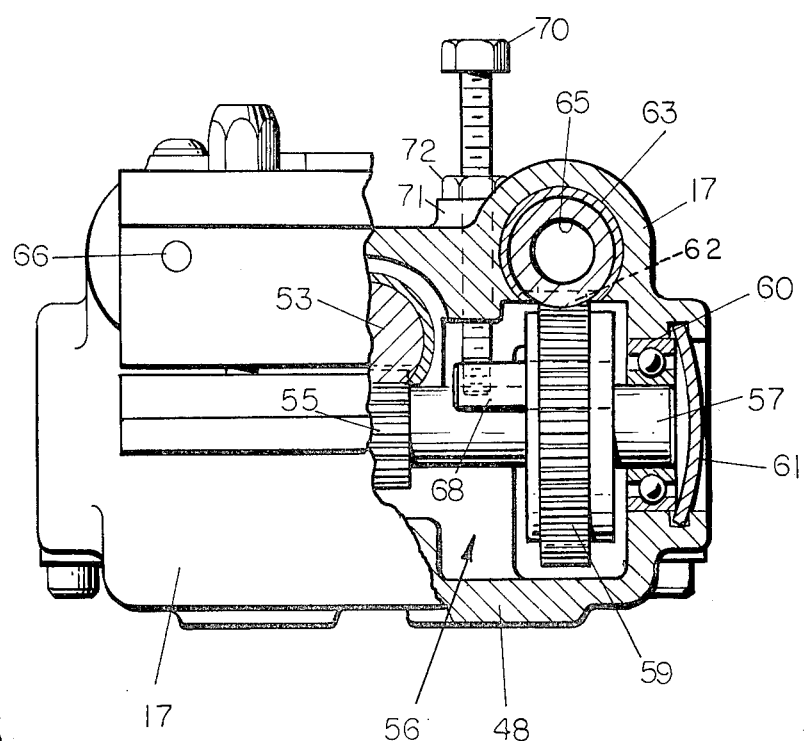
FIG. 6 is a partial sectional view taken at line 6—6 of FIG. 5.
Figure 7:
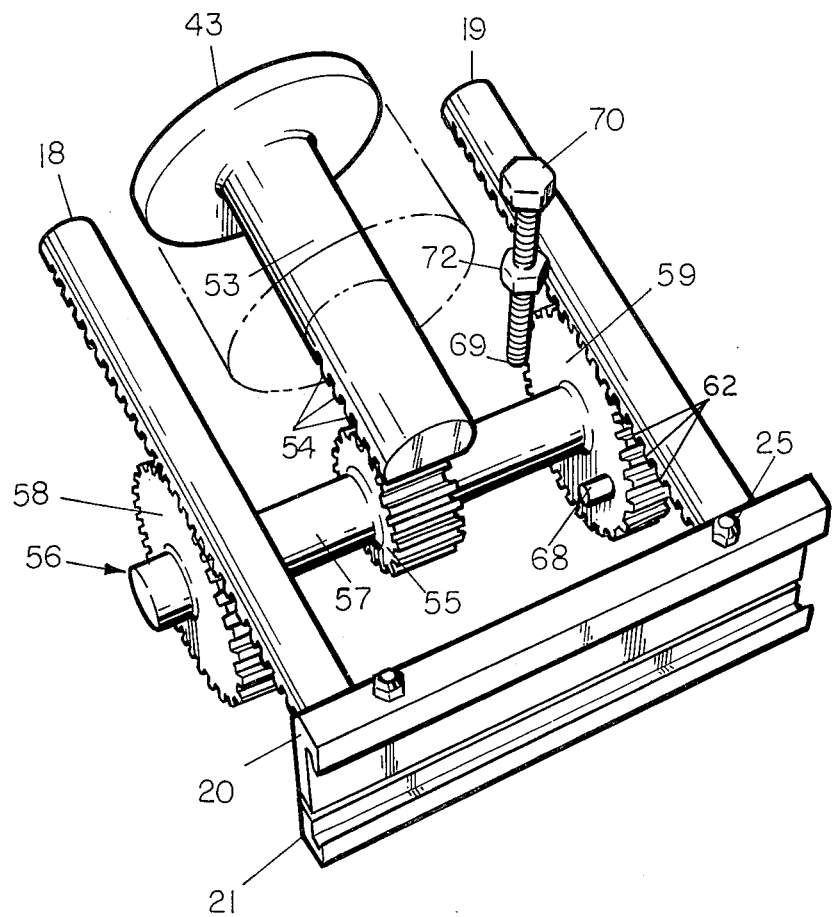
FIG. 7 is a perspective view of the internal, moving parts of the motor apparatus of FIGS. 3-6.

Opposed ends of shaft 57 are supported in bearings 60, as best shown in FIG. 6 where the bearing for the righthand end of the shaft 57 is shown supported within the housing 17. A cover 61 is provided for covering the end of the bearing to protect it from intrusion of dirt and other foreign material, also serving to generally seal the bearing area, since the lower housing section 48, in service, will be filled with a lubricating oil. The spur gear 59 meshes with teeth 62 formed in the lower surface of the rod 19. The rod 19 is supported within the housing 17 by a sleeve bearing 53 which is held in the position shown in FIG. 4 by a screw 64. The rod 19 and the rod 18 which are similarly mounted in the housing 17, are actually counter-sunk throughout nearly all of their length, thus providing an internal passage 65 therein. The passage 65 provides access through the ends of the rods 18 and 19 for manipulation of a shoulder screw 66.

As can best be seen in FIG. 4, the shoulder screw 66 threads into the cross bar 20 and a certain amount of floating movement is permitted between the shoulder screws 66 and the rods 18 and 19 by reason of the fact that a spiral spring is positioned between the head of the shoulder screw and an internal abutment 67 in the passage 65. In this manner the bolt and bar 20 are biased to the right as viewed in FIG. 4.

Of particular significance is the ability of the spring-biased system to avoid the binding of the movements of the rods 18 and 19 by the cross bar 20 so that the racks or gear segments of both rods 18 and 19 may properly mesh with their spur gears 58 and 59 without creating a situation in which their movement would be encumbered.

It can readily be seen that upon actuation of the piston 43 in the direction to extend the cross bar 20, that the gear cluster will rotate an amount dictated by the extent of movement of the piston 43.

The present mechanism, however, has utility on different size ware being swept out and thus the extent of outward movement of the cross bar 20 advantageously would be regulatable. To this end, a pin 68 is positioned in an opening formed in the spur gear 59. The pin 68 extends out from the inside surface of the spur gear 59 and is adapted to engage end 69 of a vertically positioned screw 70. The screw 70 is threaded through a boss 71 in the housing 17 with a jam nut 72 being threaded on the screw 70. Loosening of the jam nut 72 permits rotation of the screw 70 such that it will move vertically downward to position its end 69 at a selected position in the path of travel of the pin 68. Thus it can be seen that the actual forward movement of the rods 18 and 19 out of the housing 17 will be determined by the point of engagement of the pin 68 with the end 69 of the screw 70 "which constitutes an abutment means".

As viewed in FIGS. 4-6, turning of the screw 70 to raise its end 69 would increase the extent of the stroke of the rods 18 and 19 and conversely rotating the screw 70 to move it downwardly, as viewed, would decrease the length of the stroke of the rods 18 and 19. The jam nut 72, of course, serves as a means to retain the screw 70 in its adjusted position. In view of the fact that the gear cluster is motor driven through a relatively small spur gear 55 compared to the size of the spur gears 58 and 59, it can be seen that an obvious mechanical advantage is provided and for a relatively short movement of the piston 43, a full extended position of the bar 20 may be achieved. This is an important consideration from the point of view that the speed with which the bar 20 may be retracted after the ware has been positioned on the conveyor is a prime consideration. With the advent of the larger and more productive forming machines, it is important that smooth and easily adjusted sweepout mechanisms be provided in order to avoid the possibility of interference from the movement of the newly formed ware into a line of ware moving along the machine conveyor. Quick retraction of the fingers after the ware is positioned on the machine conveyor assures less chance of the fingers being touched by the approaching ware in the event precise positioning of previously ware was not achieved.

Furthermore, the present invention provides a mechanism which will move ware onto the machine conveyor with the use of less air volume needed to operate the motor since the motor is relatively small in cross-section and its full travel is significantly less than that of the prior art.

With increased productivity of machines, the sweepout must place the ware, which may be three or more at a time, onto the conveyor which is moving at a relatively high speed and slow down after the transfer for a fraction of a second to permit the ware to move out of contact with the fingers, then retract at a rapid rate to avoid the ware moving ahead on the conveyor into contact with the finger in front. Thus it can be seen that with the present invention, because of the smaller air volume used, and the mechanical advantage employed, a much more responsive sweepout has been provided.

We claim:

1. In a 90° sweepout mechanism for moving newly formed glass containers from a cooling dead plate to a moving machine conveyor wherein a sweepout head including ware-contacting fingers that are extended and retracted in a predetermined cycle is oscillated through a 90° arc, the improvement in the sweepout head finger-extending and retracting mechanism comprising:
   a horizontal cylinder mounted on the upper end of an oscillating plate;
   a piston moveable in said cylinder;
   a piston rod extending out one end of said cylinder and having a rack portion formed along one side thereof;
   a first pinion in engagement with said rack portion;
   a generally horizontal shaft extending through and supporting said first pinion;
   a pair of second pinions on said horizontal shaft at opposite sides of said first pinion;
   said second pinions being of greater diameter than said first pinion;
   a pair of horizontal racks respectively in engagement with said second pinions;
   housing means supporting said racks for horizontal reciprocation in said head;
   a finger-carrying bar connected to and spanning the gap between the ends of said pair of horizontal racks, whereby movement of said piston results in movement of said racks at a greater velocity and for a greater distance than said piston.

2. The apparatus of claim 1 further including a stop member carried by one of said pair of second pinions, and abutment means mounted in said housing and engageable by said stop member for limiting the movement of said finger-carrying bar in one direction.

3. The apparatus of claim 2 wherein said abutment means is a vertically threaded bolt threaded in the housing guiding said pair of racks.

4. The apparatus of claim 2 wherein said stop member comprises a pin extending outwardly from one of said second pinions.

5. In a 90° sweepout mechanism for moving newly formed glass containers from a cooling dead plate to a moving machine conveyor wherein a sweepout head including ware-contacting fingers that are extended and retracted in a predetermined cycle is oscillated through a 90° arc, the improvement in the oscillated sweepout head comprising:
   a horizontal cylinder;
   a piston moveable in said cylinder;
   a piston rod extending out one end of said cylinder;
   a rack portion formed along one side of said piston rod;
   a rotatable gear cluster mounted in said head in engagement with said rack portion;
   a pair of horizontal racks respectively in engagement with said gear cluster;
   housing means in said head for supporting said pair of racks for horizontal reciprocation; and
   a finger-carrying bar connected to and spanning the gap between the ends of said pair of racks, whereby movement of said piston rotates said gear cluster resulting in movement of said racks.

6. The apparatus of claim 5 wherein said gear cluster comprises:
   a first pinion;
   a generally horizontal shaft extending through said pinion;
   a pair of second pinions on said horizontal shaft at each side of said first pinion; and
   said second pinions being of greater diameter than said first pinion.

7. The apparatus of claim 6 further including a stop member carried by one of said pair of second pinions and abutment means engageable by said stop member for limiting the movement of said finger-carrying bar in one direction.

8. The apparatus of claim 7 wherein said abutment means is a vertically threaded bolt threaded in the housing guiding said pair of racks.

9. The apparatus of claim 8 wherein said stop member comprises a pin extending outwardly from one of said second pinions with its end being moveable in the vertical plane of the abutment.

* * * * *